(12) United States Patent
Dellock et al.

(10) Patent No.: US 10,590,269 B2
(45) Date of Patent: Mar. 17, 2020

(54) ULTRA-LOW DENSITY POLYPROPYLENE PLASTIC COMPOUND

(71) Applicant: Ford Global Technologies, LLC, Dearborn, MI (US)

(72) Inventors: Paul Kenneth Dellock, Northville, MI (US); Richard Gall, Ann Arbor, MI (US); Stuart Salter, White Lake, MI (US); Talat Karmo, Waterford, MI (US); Joseph Myszka, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 42 days.

(21) Appl. No.: 15/958,633

(22) Filed: Apr. 20, 2018

(65) Prior Publication Data

US 2019/0322849 A1 Oct. 24, 2019

(51) Int. Cl.
*C08L 23/12* (2006.01)
(52) U.S. Cl.
CPC .......... *C08L 23/12* (2013.01); *C08L 2205/025* (2013.01); *C08L 2205/03* (2013.01); *C08L 2205/035* (2013.01); *C08L 2205/06* (2013.01)
(58) Field of Classification Search
CPC ................. C08L 2205/025; C08L 23/12
See application file for complete search history.

(56) References Cited

U.S. PATENT DOCUMENTS

| | | | |
|---|---|---|---|
| 6,248,835 B1 * | 6/2001 | Gownder | C08L 23/10 428/373 |
| 7,365,144 B2 | 4/2008 | Ka et al. | |
| 9,006,302 B2 | 4/2015 | Amos et al. | |
| 9,758,654 B2 | 9/2017 | Jang et al. | |
| 2007/0191530 A1 * | 8/2007 | Ka | C08L 23/10 524/451 |
| 2008/0246186 A1 * | 10/2008 | Fisher | C08L 71/12 264/328.1 |
| 2015/0099840 A1 * | 4/2015 | Glogovsky | C08L 23/12 524/400 |
| 2016/0326352 A1 | 11/2016 | Yalcin et al. | |

FOREIGN PATENT DOCUMENTS

| | | |
|---|---|---|
| EP | 3130636 | 2/2017 |
| EP | 3184586 | 6/2017 |
| KR | 101307231 | 10/2013 |

OTHER PUBLICATIONS

Doumbia A., et al., Hollow Microspheres—poly-(propylene) blends: Relationship between microphseres degradation and composite properties, Polymer Degradation and Stability, vol. 114, pp. 146-153, Apr. 2015, available at URL http://www.sciencedirect.com/science/article/pii/S0141391014004571?via%3Dihub.

Borges, T.E. et al., Hollow glass microspheres/piassava fiber-reinforced homo-and co-polypropylene composites: preparation and properties, Polymer Bulletin, vol. 74(6), pp. 1979-1993, Jun. 2017, available at URL https://link.springer.com/article/10.1007/s00289-016-1819-8.

Yalcin, Baris et al., 3M Glass Bubbles iM16K for Reinforced Thermoplastics, Technical Paper, issued Oct. 2016, available at URL http://multimedia.3m.com/mws/media/868489O/3m-glass-bubbles-im16k-for-reinforced-thermoplastics.pdf.

* cited by examiner

*Primary Examiner* — Jeffrey C Mullis
(74) *Attorney, Agent, or Firm* — Burris Law, PLLC

(57) ABSTRACT

A composite material is provided. The composite material includes a polypropylene blend, at least one additive, and at least one structural filler in an amount between 1.0 wt. % and 10.0 wt. %. The polypropylene blend includes a homopolymer polypropylene having a minimum ASTM D638 tensile strength of 4,000 psi in an amount between 40 wt. % and 70 wt. %, a high crystallinity homopolymer polypropylene having a minimum ASTM D638 tensile strength of 6,000 psi in an amount between 5 wt. % and 30 wt. %, and an impact copolymer having a rubber content greater than zero and less than 30 wt. %, the impact copolymer being in an amount between 3 wt. % and 10 wt. %.

15 Claims, No Drawings

ULTRA-LOW DENSITY POLYPROPYLENE PLASTIC COMPOUND

FIELD

The present disclosure relates to polypropylene composite materials.

BACKGROUND

The statements in this section merely provide background information related to the present disclosure and may not constitute prior art.

Fuel efficiency has been a motivating force behind vehicle design in recent years and will likely continue in the foreseeable future. As such, reducing the weight of the vehicle, improving aerodynamics, and improved efficiency in design will remain priorities for vehicle designers. In addition to fuel efficiency, reduced cost of components, including parts, assemblies, and subsystems, among others, is another priority for vehicle designers and manufacturers.

Accordingly, composite materials have been used to reduce the weight of vehicles, however, their costs have been much higher than traditional materials such as steel or aluminum. One such composite material that is used in a variety of vehicle components is mineral or talc filled polypropylene copolymers. Polypropylene copolymer parts often include talc in about 20 wt. % as a structural filler to improve mechanical properties. Generally, polypropylene copolymers are available at a low cost, and the addition of talc improves stiffness, impact strength, and heat resistance.

However, talc-filled polypropylene copolymers still have a relatively high density (between about 1.04 and 1.06 gm/cm$^3$). Furthermore, the addition of other components to the polypropylene copolymer composite such viscosity agents, which improve moldability (e.g., injection molding) of the polypropylene copolymer composite, further increases density and overall costs.

The present disclosure addresses these challenges related to the design and manufacture of lighter weight and lower cost vehicle components.

SUMMARY

In one form of the present disclosure, a composite material is provided. The composite material comprises a polypropylene blend, at least one additive and at least one structural filler in an amount between 1.0 wt. % and 10.0 wt. %. The polypropylene blend comprises a homopolymer polypropylene having a minimum ASTM D638 tensile strength of 4,000 psi in an amount between 40 wt. % and 70 wt. %, a high crystallinity homopolymer polypropylene having a minimum ASTM D638 tensile strength of 6,000 psi in an amount between 5 wt. % and 30 wt. %, and an impact copolymer having a rubber content greater than zero and less than 30 wt. %, the impact copolymer being in an amount between 3 wt. % and 10 wt. %.

The additives may include, among others, a coupling agent, a viscosity agent, zinc carboxylate salt, an antioxidant, a UV stabilizer, color, and a flame retardant, depending on the application.

The polypropylene blend in another form further comprises a tie-layer resin in an amount of 1.5 wt. %, the homopolymer polypropylene is 61.0 wt. %, the high crystallinity homopolymer polypropylene is 21.0 wt. % and the impact copolymer is 5.0 wt. %. Moreover, the structural filler comprises glass bubbles in an amount of 4.0 wt. % and chopped fiberglass in an amount of 5.0 wt. %. While the additives comprise a UV stabilizer in an amount of 0.7 wt. %, an antioxidant in an amount of 0.3 wt. %, a color additive in an amount of 1.25 wt. %, and a viscosity agent in an amount of 0.25 wt. %.

The structural filler may include glass fibers, glass bubbles, and carbon fibers, among others. In one form, the glass fibers have a 14 micron diameter. In another form, the composite material according to the teachings of the present disclosure contains no talc.

In one variation, the tie-layer resin is in an amount between 1.0 to 2.0 wt. %. In another form, the homopolymer polypropylene is a recycled material.

In one form, the composite material has the mechanical properties of a tensile yield strength of at least 35 MPa, a yield elongation of at least 3.5%, a tensile modulus of at least 2.0 GPa, a flexural modulus of at least 2.0 GPa, a notched IZOD at 24° C. of at least 5.5 kJ/m$^2$, and a heat deformation temperature at 1.8 MPa of at least 58° C. Numerous parts with varying geometries may be formed with the composite material of the present disclosure, including a vehicle leaf screen.

In another form of the present disclosure, an injection moldable composite material for use in a structural component is provided. The injection moldable composite material comprises a polypropylene blend, a structural filler, and at least one additive. The polypropylene blend comprises a homopolymer polypropylene having a minimum ASTM D638 tensile strength of 4,000 psi in an amount between 40 wt. % and 70 wt. %, a high crystallinity homopolymer polypropylene having a minimum ASTM D638 tensile strength of 6,000 psi in an amount between 5 wt. % and 30 wt. %, and an impact copolymer having a rubber content greater than zero and less than 30 wt. % in an amount between 2 wt. % and 10 wt. %. The structural filler is selected from the group consisting of glass fiber in an amount between 1.0 and 10.0 wt. % and hollow glass spheres in an amount between 1.0 and 10.0 wt. %.

In this form, the additives may include a coupling agent, a viscosity agent, zinc carboxylate salt, an antioxidant, a UV stabilizer, color, and a flame retardant, among others, depending on the application.

In one variation, the structural filler comprises glass fibers in the amount of 5.0 wt. % and hollow glass spheres in the amount of 4.0 wt. %. In another variation, the injection moldable composite material contains no talc.

In another form of the present disclosure, a structural component is manufactured from the injection moldable composite material according to the teachings herein and has the mechanical properties of a tensile yield strength of at least 35 MPa, a yield elongation of at least 3.5%, a tensile modulus of at least 2.0 GPa, a flexural modulus of at least 2.0 GPa, a notched IZOD at 24° C. of at least 5.5 kJ/m$^2$, a heat deformation temperature at 1.8 MPa of at least 58° C., and a melt flow rate of at least 16.9 g/10 min. Numerous parts of varying geometries may be formed with the injection moldable composite material of the present disclosure, including a vehicle leaf screen, among other parts/components. In one form, the homopolymer polypropylene is a recycled material.

In one variation of this structural component, the additive comprises a UV stabilizer in an amount of 0.7 wt. %, an antioxidant in an amount of 0.3 wt. %, a color additive in an amount of 1.25 wt. %, and a viscosity agent in an amount of 0.25 wt. %.

In yet another polypropylene copolymer of the present disclosure, an injection moldable composite material for use in a structural component is provided. The injection moldable composite material comprises a polypropylene blend, chopped glass fibers in an amount between 1.0 and 10.0 wt. %, hollow glass spheres in an amount between 1.0 and 10.0 wt. %, a coupling agent in an amount between 1.5 wt. % and 3 wt. %, a viscosity agent in an amount between 0.15 wt. % and 0.50 wt. %, an antioxidant in an amount between 0.1 wt. % and 0.5 wt. %, a UV stabilizer in an amount between 0.1 wt. % and 1.5 wt. %, and a color additive in an amount between 1.0 wt. % and 3.0 wt. %. The polypropylene blend comprises a homopolymer polypropylene having a minimum ASTM D638 tensile strength of 4,000 psi in an amount between 40 wt. % and 70 wt. %, a high crystallinity homopolymer polypropylene having a minimum ASTM D638 tensile strength of 6,000 psi in an amount between 5 wt. % and 30 wt. %, and an impact copolymer having a rubber content greater than zero and less than 30 wt. %, the impact copolymer being in an amount between 5.0 wt. % and 12.0 wt. %. Similarly, this composite material contains no talc in one form of the present disclosure.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses. It should be understood that throughout the drawings, corresponding reference numerals indicate like or corresponding parts and features.

Generally, the present disclosure provides a unique composite material that includes a polypropylene blend, at least one structural filler, and at least one additive, which results in a material that reduces overall material density while increasing ductility and strength at a reduced cost. For certain applications, the composite material is injection moldable, and the inventors have discovered that the composite material according to the teachings of the present disclosure can provide the desired mechanical properties and reduced density without containing any talc.

Each of the elements of the composite material of the present disclosure and their criticality in achieving the light weight, lower cost, and improved mechanical properties, in particular for vehicle component/part applications, is now described in greater detail.

Polypropylene Blend

The inventors have discovered a unique polypropylene blend, which in one form includes a homopolymer polypropylene having a minimum ASTM D638 tensile strength of 4,000 psi in an amount between about 40 wt. % and about 70 wt. %, a high crystallinity homopolymer polypropylene having a minimum ASTM D638 tensile strength of 6,000 psi in an amount between about 5 wt. % and about 30 wt. %, and an impact copolymer having a rubber content greater than zero and less than about 30 wt. %, the impact copolymer being in an amount between about 3 wt. % and about 10 wt. %. Additional, more targeted percentages for each component of the polypropylene blend are described in greater detail below, along with exemplary test data that demonstrates the criticality of the compositional ranges of the present disclosure.

Homopolymer Polypropylene

The homopolymer polypropylene (HP) in one form is recycled but may be a virgin HP or a combination of a recycled HP and virgin HP while remaining within the scope of the present disclosure. The recycled HP is used in order to reduce the cost of the composite material; however, its material properties can vary significantly from lot to lot. Accordingly, depending on the properties of the recycled HP, an amount of virgin HP may be added to improve mechanical properties, as set forth in greater detail below.

To achieve certain design specifications, and particularly for automotive vehicle component applications, the HP has a minimum tensile strength of 4,000 psi according to ASTM D638 in one form of the present disclosure. A range of HP in the composite material according to the present disclosure is between about 40 wt. % and about 70 wt. %, and in one form is about 61.0 wt. %, both of which are recycled HP.

High Crystallinity Homopolymer Polypropylene

A high crystallinity homopolymer polypropylene (HcHP) is included in the inventive composite material in order to increase tensile strength. As understood by those skilled in the art, the term "high crystallinity" means a resin with a percent crystallinity greater than about 97% (+/−0.2% tolerance), and which has a very high flexural modulus (approximately 1% Secant, ASTM D-790A, 0.05 in/min.).

To achieve certain design specifications, and particularly for automotive vehicle component applications, the HcHP has a minimum tensile strength of 6,000 psi according to ASTM D638 in one form of the present disclosure. A range of HcHP in the composite material according to the present disclosure is between about 5 wt. % and about 30 wt. %, and in one form is about 21.0 wt. %

Impact Copolymer

An impact copolymer having a rubber content is used in the inventive composite material to provide improved cold impact properties. In one form, the impact copolymer is in an amount between about 3 wt. % and about 10 wt. % and contains greater than zero and less than about 30 wt. % rubber. In one form, the impact copolymer is about 5.0 wt. %.

Tie-Layer Resin

The polypropylene blend according to the present disclosure may also include a tie-layer resin, which improves adhesion of the various constituents, namely, the HP, the HcHP, and the impact copolymer. In one form, the tie-layer resin is provided in an amount of about 1.5%.

Exemplary properties of each of the constituent components of the HP, the HcHP, and the impact polypropylene are shown below in TABLE 1:

TABLE 1

Properties of Polypropylene Blend Constituents

| | Homopolymer polypropylene | High crystallinity homopolymer polypropylene | Impact polypropylene copolymer |
|---|---|---|---|
| Flexural strength* (psi) | | ≥300,000 (2,068 MPa) | ≥135,000 (931 MPa) |
| Impact strength** at 23° C. (ft-lb/in) | | ≥0.4 (21 J/m) | No Break |
| Impact strength*** at −40° C. (ft-lb) | | | ≥35 (47 J) |
| Percent elongation**** (%) | | ≥5 | ≥7 |
| Tensile strength**** (psi) | ≥4000 (27.5 MPa) | ≥6000 (41 MPa) | ≥2700 (19 MPa) |
| Wt. % in polypropylene copolymer (desired) | 40-70 | 5-30 (~15) | ≥2 (3-10) |

*at about 0.05 in/min (about 1.3 mm/min) and 1% secant as tested to ASTM D790A
**Notched IZOD as tested to ASTM D256A
***Instrumented as tested to ASTM D3763
****at about 2 in/min (about 50 mm/min) as tested to ASTM D638

Structural Fillers

A variety of structural fillers are contemplated according to the present disclosure to improve mechanical properties of the composite material, including but not limited to tensile yield strength, yield elongation, tensile modulus, and flexural modulus. Generally, a structural filler is provided in an amount between about 1.0 wt. % and 10.0 wt. %. The structural filler may be glass fibers, glass bubbles (i.e. hollow glass spheres), and/or carbon fibers, among others.

In one form, the structural filler comprises glass bubbles in an amount of about 4.0 wt. % and chopped fiberglass (or short glass fibers) in an amount of about 5.0 wt. %. In still another form, the structural filler is short glass fibers in an amount between about 1.0 and 10.0 wt. % and hollow glass spheres in an amount between about 1.0 and 10.0 wt. %. In one form, the chopped fiberglass has an average 14 micron diameter. Advantageously, the composite material in one form does not contain any talc.

In one form, the glass bubbles have the properties and characteristics set forth below in TABLE 2:

TABLE 2

Properties of Glass Bubbles/Hollow Glass Spheres

| Property | Value |
| --- | --- |
| Crush strength, 90% survival by volume (ksi) | 16 (115 MPa) @ 90% survival |
| Flotation (density <1.0 g/cm^3) | 96% |
| Hardness | Mohs scale 5 |
| Packing factor (bulk density to true particle density) | 60% |
| pH (at 5 wt. % loading in water) | 9.5 |
| Shape | Hollow bubbles with thin walls |
| Softening point (° C.) | >600 |
| True density (g/cm^3) | 0.46 ± 0.03 |
| Typical D10 Diameter (μm) | 12 |
| Typical D50 Diameter (Median) (μm) | 20 |
| Typical D90 Diameter (μm) | 30 |
| Volatile content (by weight) | 0.50% |

These glass bubbles are structural fillers that recoup the degradation of properties seen when substituting conventional glass spheres for talc, yielding a less expensive and lower density polypropylene copolymer composite material. This glass bubble is a chemically strengthened high-strength glass sphere developed to withstand forces of at least 115 MPa (16,000 psi). Many vehicle parts experience molding forces of at least 100 MPa (14,000 psi) during the molding process. The glass bubble used in the composite material of the present disclosure withstands these pressures yet has a density of about 0.46 g/cm^3 which is about a sixth (⅙) the density of talc (about 2.6 to about 2.8 g/cm^3). As such, when substituting all or most talc (about 22 wt. % or about 8.5 vol. %) with an equivalent volume percent of these glass bubbles, the glass bubbles comprise a little more than 4.5 wt. % at that 8.5 vol. %. While the glass bubbles are more expensive (about 5× per pound more than the talc), at about ⅙ of the volume of the talc, the glass bubbles are overall more economical with improved performance capabilities/mechanical properties.

The geometry of the glass bubbles also improves the viscosity of the composite material during molding and reduces molding pressures vs talc filled plastics (e.g. polypropylene copolymer). The lower mass of the polypropylene copolymer composite part results in less energy to heat or cool the plastic, thus enabling faster cycle times and higher part throughputs. Consequently, reducing the environmental impact and life-cycle costs for both the manufacture of the vehicle and the vehicle.

The heat of deflection of the inventive polypropylene blend varies dependent upon the structural filler. In one test, the short/chopped glass fibers were sized for use with polypropylene, with a diameter ranging between about 12 μm to about 18 μm, and lengths ranging between about 2 mm to about 14 mm. As shown, both carbon and glass fibers increase both the flexural strength and the tensile strength of polypropylene copolymer. Additionally, both carbon fibers and/or processing additives reduce part thickness while improving mechanical properties. Results of this testing are shown below in TABLE 3:

TABLE 3

Effect of Structural Fillers on Heat of Deflection

| | Polypropylene copolymer with | | | |
| --- | --- | --- | --- | --- |
| | 22 wt. % Talc | 5 wt. % glass bubbles | 5 wt. % short glass fibers | 5 wt. % short carbon fibers |
| Heat of deflection ◊ | ≥53° C. | ≥44° C. | ≥68° C. | ≥84° C. |

◊ Subjected to about 261 psi (1.8 MPa) of load as tested to ISO 75-2

Additives

A variety of additives may be employed according to the teachings of the present disclosure. The additives include, but are not limited to, a coupling agent, a viscosity agent, zinc carboxylate salt, an antioxidant, a UV stabilizer, color, and a flame retardant.

Viscosity Agent

A viscosity agent is generally used in order to improve the flowability of the composite material in forming operations such as injection molding. The viscosity agent improves the viscosity (melt flow) of the composite material when molding and facilitates "down-gaging" (i.e. reduction of part thickness). These fatty acid derivatives fracture the polymer chain of the polypropylene molecules and increase melt flow of the material and also act as mold release agents. The addition of between about 0.1% to about 0.5% processing agent significantly improves viscosity and toughness of the polypropylene copolymer, while slightly reducing (2-5%) the tensile yield of the polypropylene copolymer. In one form, the viscosity agent is included in an amount of 0.25 wt. %. The properties of the homopolymer polypropylene are improved by additions of a viscosity agent, as shown below in TABLE 4:

TABLE 4

Effect of Viscosity Agent on Properties of HP

| | Homopolymer Polypropylene | Homopolymer Polypropylene with 0.5 wt. % Viscosity Agent |
| --- | --- | --- |
| Viscosity (Melt Flow Rate) (g/10 min) | 0.4 | 6.0 |
| Notched IZOD (ft-lb/in) | 4.0 | 2.6 |
| Tensile Yield (psi) | 4710 | 4500 |
| % Elongation (%) | 6.8 | 7.2 |
| Flexural Modulus (ksi) | 1.9 | 1.6 |
| Gardner Impact (in-lbs.) | 8 | 40 |

Small quantities of viscosity agents significantly improve the melt flow when the HP includes recycled content. By their nature, recycled materials often have varying feed stocks imbuing varying material properties from batch to batch. To determine the amount of viscosity agents, the inventors first determined the viscosity of the incoming polypropylene copolymer and then calculated the amount of viscosity agent to achieve the desired polypropylene blend viscosity. Increased quantities of viscosity agent were thus used to achieve the desired polypropylene blend viscosity when starting with a recycled extrusion grade of the homopolymer polypropylene.

Zinc Carboxylate Salt

Zinc carboxylate salt is used to increase the heat of deflection temperature of the inventive composite material. Small amounts of zinc carboxylate salt (about 0.5 wt. % to about 2.0 wt. %) increases the heat of deflection temperature of the polypropylene copolymer by up to about 5° C.

Antioxidant

An antioxidant may be used to inhibit oxidation during processing of the inventive composite material. Antioxidants act as melt processing stabilizers, improving heat stability and oxidation resistance. The addition of about 0.1 to about 5.0 wt. % antioxidant to the polypropylene blend achieves the desired results, and in one form, an amount of about 0.3 wt. % is used.

Ultraviolet (UV) Stabilizer

A UV stabilizer is contemplated in applications that receive excessive amounts of UV radiation, such as exterior components of a vehicle, including by way of example a leaf screen. The UV stabilizer is used in an amount between about 0.1 wt. % and about 1.5 wt. %, and in one form is about 0.7 wt. %.

Flame Retardants

Flame retardants may be added to the polypropylene blend, depending on the desired level of flame resistance for a given application. Flame retardant additives include: brominated halogen, chlorinated halogen, phosphorus based, or metal oxides (endothermic).

Colorants

Colorants, or color additives, are added to the polypropylene blend depending on the desired color for a given application. Commercially available polypropylene compatible colorants may be employed as appropriate. Color concentrate is used in an amount between about 1.0 wt. % and about 3.0 wt. %, and in one form is a black concentrate used in an amount of about 1.25 wt. %.

Mechanical Properties

Various improved mechanical properties that are achieved with the innovative composite material of the present disclosure are provided in greater detail below with reference to specific testing. In one form, the composite material has mechanical properties of a tensile yield strength of at least about 35 MPa, a yield elongation of at least about 3.5%, a tensile modulus of at least about 2.0 GPa, a flexural modulus of at least about 2.0 GPa, a notched IZOD at 24° C. of at least about 5.5 Kj/m$^2$, and a heat deformation temperature at 1.8 MPa of at least about 58° C.

The following specific compositions are given to illustrate the unique composite material, properties, and use of composite materials prepared according to the teachings of the present disclosure and should not be construed to limit the scope of the disclosure. Those skilled in the art, in light of the present disclosure, will appreciate that slight changes can be made in the specific compositions to achieve equivalents that obtain alike or similar results without departing from or exceeding the spirit or scope of the present disclosure.

Exemplary compositions according to experimental testing are found below in Tables 5 and 6. Table 5 includes the compositions of baseline/comparative compositions and six (6) compositions/formulations according to the teachings of the present disclosure, and Table 6 includes the mechanical properties of each of these compositions.

TABLE 5

Baseline Compositions and Inventive Compositions

| COMPONENT | Comparative Baseline 1 wt. % | Comparative Baseline 2 wt. % | Comparative Baseline 3 wt. % | Inventive Composition A wt. % | Inventive Composition B wt. % |
| --- | --- | --- | --- | --- | --- |
| Recycled Homopolymer Polypropylene | | | | 39.6 | 42.3 |
| Virgin Polypropylene | 57 | 54-59 | | | |
| High Crystallinity Polypropylene | | | | 39.7 | 40 |
| Impact Copolymer | | | | 5 | 4 |
| Glass bubbles | | | | 6 | 6 |
| Short Glass Fibers | | | | 5 | 3 |
| Recycled Short Carbon Fibers | | | | 0 | 0 |
| Tie-Resin | | | | 1 | 1 |
| Viscosity Agent | | | | 0.2 | 0.2 |
| Zinc Carboxylate Salts | | | | 1 | 1 |
| Antioxidant | | | | 0.6 | 0.6 |
| Ultraviolet Light Stabilizers | | | | 0.6 | 0.6 |
| Colorants | | | | 1.3 | 1.3 |
| Talc | 22 | 22 | | 0 | 0 |
| Calcium | | | | | |

TABLE 5-continued

Baseline Compositions and Inventive Compositions

| COMPONENT | Comparative Baseline 1 | Comparative Baseline 2 | Comparative Baseline 3 | Inventive Composition A | Inventive Composition B |
|---|---|---|---|---|---|
| Stearate | | | | | |
| Mica | | | | | |
| Ash Content | 21 | 19-24 | 9.4 | | |
| TOTAL | 100 | 100 | | 100 | 100 |

| COMPONENT | Inventive Composition C wt. % | Inventive Composition D wt. % | Inventive Composition E wt. % | Inventive Composition F wt. % |
|---|---|---|---|---|
| Recycled Homopolymer Polypropylene | 39.1 | 62.19 | 61.19 | 61.00 |
| Virgin Polypropylene | | | | |
| High Crystallinity Polypropylene | 40.2 | 20.73 | 20.73 | 21.00 |
| Impact Copolymer | 5 | 5.00 | 5.00 | 5.00 |
| Glass bubbles | 6 | 5.00 | 5.00 | 4.00 |
| Short Glass Fibers | 0 | 4.00 | 4.00 | 5.00 |
| Recycled Short Carbon Fibers | 5 | 0 | 0 | 0 |
| Tie-Resin | 1 | 0 | 2.0 | 1.5 |
| Viscosity Agent | 0.2 | 0.5 | 0.03 | 0.25 |
| Zinc Carboxylate Salts | 1 | 0.5 | 0 | 0 |
| Antioxidant | 0.6 | 0.3 | 0.2 | 0.3 |
| Ultraviolet Light Stabilizers | 0.6 | 0.7 | 0.6 | 0.7 |
| Colorants | 1.3 | 1.25 | 1.25 | 1.25 |
| Talc | 0 | 0 | 0 | 0 |
| Calcium Stearate | | 0 | 0 | 0 |
| Mica | | 0 | 0 | 0 |
| Ash Content | | | | |
| TOTAL | 100 | 100 | 100 | 100 |

TABLE 6

Mechanical Property Data of Comparative Compositions and Inventive Compositions

| MATERIAL PROPERTIES | Comparative Baseline 1 | Comparative Baseline 2 | Comparative Baseline 3 | Inventive Composition A | Inventive Composition B |
|---|---|---|---|---|---|
| Yield Strength (MPa) | 24.8 | 20 | 35.3 | 28.1 | 24.3 |
| Percent Elongation (%) | 3.93 | | 4.06 | 4.8 | 6 |
| Tensile Modulus (GPa) | 2.4 | 1.9 | 1.9 | 2.8 | 2.5 |
| Flexural Modulus (GPa) | 2.3 | 1.9 | 2 | 2.7 | 2.4 |
| Notched IZOD at 23° C. per ASTM D256A (kJ/m^2) | 9.1 | 4 | 5.2 | 7.6 | 7.2 |
| Notched IZOD at −30° C. per ASTM D256A (kJ/m^2) | 7 | 1.8 | 4.4 | 6.3 | 6.2 |
| Heat of Deflection (° C.) at 1.8 MPa per ISO 75-2 | 53 | 53 | 53 | 68 | 55 |
| Viscosity (melt flow rate at 230° C. and 2.16 kg load) (g/10 min) | 21.5 | | 15.7 | 21 | 26 |
| Density (g/cm^3) | 1.06-1.07 | 1.02-1.10 | 0.91 | 0.91 | 0.9 |
| Yield Strength: Ultimate (MPa) | 16.9 | | 33.2 | | |
| Percent Elongation: Ultimate (Break) (%) | 43 | | 5 | | |
| Tensile Testing Speed (mm/min) | 50 | | 50 | | |

TABLE 6-continued

Mechanical Property Data of Comparative Compositions and Inventive Compositions

| | | |
|---|---|---|
| Flexural Strength (MPa) | 37.2 | 46 |
| Heat of Deflection (° C.) at 0.45 MPa per ISO 75-2 | | |
| Mold Shrink due to Flow (%) | 1.53 | 0.83 |
| Mold Shrink/Cross Flow (%) | 1.48 | 0.72 |
| Hardness (Shore D) | 70.7 | 73 |

| MATERIAL PROPERTIES | Inventive Composition C | Inventive Composition D | Inventive Composition E | Inventive Composition F |
|---|---|---|---|---|
| Yield Strength (MPa) | 34.6 | 27.1 | 36 | 35.6 |
| Percent Elongation (%) | 4.7 | 3.63 | 3.99 | 3.65 |
| Tensile Modulus (GPa) | 0.2 | 1.9 | 2 | 2 |
| Flexural Modulus (GPa) | 3.1 | 1.8 | 2 | 2 |
| Notched IZOD at 23° C. per ASTM D256A (kJ/m^2) | 9.2 | 4.1 | 5.8 | 5.8 |
| Notched IZOD at −30° C. per ASTM D256A (kJ/m^2) | 6.8 | 4 | 4.8 | 4.7 |
| Heat of Deflection (° C.) at 1.8 MPa per ISO 75-2 | 84 | 51 | 56 | 58 |
| Viscosity (melt flow rate at 230° C. and 2.16 kg load) (g/10 min) | 23 | 41 | 16 | 16.9 |
| Density (g/cm^3) | 0.89 | 0.9 | 0.91 | 0.91 |
| Yield Strength: Ultimate (MPa) | | 25 | 34.9 | 34.4 |
| Percent Elongation: Ultimate (Break) (%) | | 7 | 4 | 4 |
| Tensile Testing Speed (mm/min) | | 50 | 50 | 50 |
| Flexural Strength (MPa) | | 38.2 | 46 | 45.6 |
| Heat of Deflection (° C.) at 0.45 MPa per ISO 75-2 | | | | |
| Mold Shrink due to Flow (%) | | 1.33 | 1.43 | 1.44 |
| Mold Shrink/Cross Flow (%) | | 1.28 | 1.24 | 1.22 |
| Hardness (Shore D) | | | 71 | 72 |

As shown, the improvements in mechanical properties with respect to the baseline compositions is remarkable and includes lower density while reducing cost. This careful balance of increased mechanical properties, lighter weight, and lower cost has been achieved by the inventors through extensive testing and analysis of surprising results.

Accordingly, a novel composite material has been developed by the inventors that utilizes glass bubbles to significantly reduce the density of the polymer while delivering a low cost solution to increase the ductility and strength of the resin at an affordable cost. The inventors were surprised to discover that the use of additives and the addition of small amounts of structural fillers recouped the degradation of properties seen when substituting glass bubbles for talc. Therefore, the teachings of the present disclosure yield a low density material that is lower cost than exiting state of the art materials.

As used herein, it should be understood that the terms "homopolymer blend" and "polypropylene copolymer" may be used interchangeably. Also, the term "structural component" should be construed to mean a part or component that carries structural loads (e.g., tension, compression, bending), and transfers those loads to and from adjacent components, versus a part that is merely used as a fairing or cover, and which carries no significant loads. One skilled in the art of vehicle design understands this distinction.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A composite material comprising:
   a polypropylene blend comprising:
   a homopolymer polypropylene having a minimum ASTM D638 tensile strength of 4,000 psi in an amount of 61.0 wt. %;
   a high crystallinity homopolymer polypropylene having a minimum ASTM D638 tensile strength of 6,000 psi in an amount of 21.0 wt. %;

an impact copolymer having a rubber content greater than zero and less than 30 wt. %, the impact copolymer being in an amount of 5.0 wt. %; and a tie-layer resin in an amount of 1.5 wt. %;

structural fillers comprising glass bubbles in an amount of 4.0 wt. % and chopped fiberglass in an amount of 5.0 wt. %; and additives comprising a UV stabilizer in an amount of 0.7 wt. %; an antioxidant in an amount of 0.3 wt. %; a color additive in an amount of 1.25 wt. %; and a viscosity agent in an amount of 0.25 wt. %.

2. The composite material according to claim 1, wherein the additives further comprise a coupling agent, zinc carboxylate salt, and a flame retardant.

3. The composite material according to claim 1, wherein the fibers of the chopped fiberglass have a 14 micron diameter.

4. The composite material according to claim 1, wherein no talc is contained within the composite material.

5. The composite material according to claim 1, wherein the homopolymer polypropylene is a recycled material.

6. A part formed from the composite material according to claim 1 having mechanical properties of:
- a tensile yield strength of at least 35 MPa;
- a yield elongation of at least 3.5%;
- a tensile modulus of at least 2.0 GPa;
- a flexural modulus of at least 2.0 GPa;
- a notched IZOD at 24° C. of at least 5.5 kJ/m$^2$; and
- a heat deformation temperature at 1.8 MPa of at least 58° C.

7. A vehicle leaf screen comprising the composite material according to claim 1.

8. An injection moldable composite material for use in a structural component comprising:
   a polypropylene blend comprising:
      a homopolymer polypropylene having a minimum ASTM D638 tensile strength of 4,000 psi in an amount between 40 wt. % and 70 wt. %;
      a high crystallinity homopolymer polypropylene having a minimum ASTM D638 tensile strength of 6,000 psi in an amount between 5 wt. % and 30 wt. %; and
      an impact copolymer having a rubber content greater than zero and less than 30 wt. % in an amount between 2 wt. % and 10 wt. %;
   a structural filler comprising glass fibers in the amount of 5.0 wt. % and hollow glass spheres in the amount of 4.0 wt. %; and
   at least one additive.

9. The injection moldable composite material according to claim 8, wherein the additive is selected from the group consisting of a coupling agent, a viscosity agent, zinc carboxylate salt, an antioxidant, a UV stabilizer, color, and a flame retardant.

10. The injection moldable composite material according to claim 8, wherein no talc is contained within the composite material.

11. A structural component manufactured from the injection moldable composite material according to claim 8 and having the following mechanical properties:
- a tensile yield strength of at least 35 MPa;
- a yield elongation of at least 3.5%;
- a tensile modulus of at least 2.0 GPa;
- a flexural modulus of at least 2.0 GPa;
- a notched IZOD at 24° C. of at least 5.5 kJ/m$^2$;
- a heat deformation temperature at 1.8 MPa of at least 58° C.; and
- a melt flow rate of at least 16.9 g/10 min as measured under a 2.16 kg load at 230° C.

12. The injection moldable composite material according to claim 8, wherein the homopolymer polypropylene is a recycled material.

13. The injection moldable composite material according to claim 8, wherein the additive comprises:
- a UV stabilizer in an amount of 0.7 wt. %;
- an antioxidant in an amount of 0.3 wt. %;
- a color additive in an amount of 1.25 wt. %; and
- a viscosity agent in an amount of 0.25 wt. %.

14. An injection moldable composite material for use in a structural component comprising:
   a polypropylene blend comprising:
      a homopolymer polypropylene having a minimum ASTM D638 tensile strength of 4,000 psi in an amount between 40 wt. % and 70 wt. %;
      a high crystallinity homopolymer polypropylene having a minimum ASTM D638 tensile strength of 6,000 psi in an amount between 5 wt. % and 30 wt. %; and
      an impact copolymer having a rubber content greater than zero and less than 30 wt. %, the impact copolymer being in an amount between 5.0 wt. % and 12.0 wt. %;
   chopped glass fibers in an amount between 1.0 and 10.0 wt. % and hollow glass spheres in an amount between 1.0 and 10.0 wt. %
   a coupling agent in an amount between 1.5 wt. % and 3 wt. %,
   a viscosity agent in an amount between 0.15 wt. % and 0.50 wt. %;
   an antioxidant in an amount between 0.1 wt. % and 0.5 wt. %;
   a UV stabilizer in an amount between 0.1 wt. % and 1.5 wt. %; and
   color additive in an amount between 1.0 wt. % and 3.0 wt. %.

15. The injection moldable composite material according to claim 14, wherein no talc is contained within the composite material.

* * * * *